United States Patent [19]

Tomitaka et al.

[11] Patent Number: 5,426,546

[45] Date of Patent: Jun. 20, 1995

[54] RECORDING OR REPRODUCING APPARATUS

[75] Inventors: Akira Tomitaka, Kanagawa; Junji Kobayashi, Tokyo, both of Japan

[73] Assignee: Canon Kabushiki Kaisha, Tokyo, Japan

[21] Appl. No.: 740,306

[22] Filed: Aug. 5, 1991

[30] Foreign Application Priority Data

Aug. 31, 1990 [JP] Japan .................................. 2-228242

[51] Int. Cl.6 ............................................. G11B 15/00
[52] U.S. Cl. ..................................... 360/85; 360/95
[58] Field of Search ..................................... 360/85, 95

[56] References Cited

U.S. PATENT DOCUMENTS 4,775,904 10/1988 Kimura et al. ...................... 360/85
5,055,954 10/1991 Kato ..................................... 360/85

Primary Examiner—Paul M. Dzierzynski
Assistant Examiner—Richard Hanig
Attorney, Agent, or Firm—Robin, Blecker, Daley & Driscoll

[57] ABSTRACT

A recording or reproducing apparatus wherein a first chassis to which a head is secured and a second chassis on which a recording medium is to be mounted are overlappingly disposed is arranged as follows: After a tape-shaped recording medium is mounted on the apparatus, when the tape moves toward the head according to an action of abutting the tape against the head, a force for moving the second chassis is applied to the inside of a plane defined by four points of four slide guide shafts on the second chassis. Further, the second chassis is arranged to be guided at two points which are diagonally located among the four points.

11 Claims, 4 Drawing Sheets

RECORDING OR REPRODUCING APPARATUS

BACKGROUND OF THE INVENTION

1. Field of the Invention

This invention relates to a recording or reproducing apparatus and more particularly to the loading action of a recording medium loading mechanism.

2. Description of the Related Art

The conventional recording or reproducing apparatuses include a cassette-biting type magnetic recording or reproducing apparatus which is arranged to allow a drum thereof to intrude (bite) into a recessed part provided in the cassette of a recording medium for the purpose of reduction in size of the apparatus. Referring to FIG. 1, the apparatus of this type is provided with two chassis, i.e., a main chassis 1 and a slide chassis 3. A slide gear 5 is interlocked with a loading motor (not shown) and rotates when the loading motor rotates. A slide pin 6 is secured to the slide gear 5. A slide plate 7 is secured to the slide chassis 3. A power for moving the slide chassis 3 is derived from the rotation of the slide gear 5 which causes a sliding movement of the pin 6 along the inner side of a slot formed in the slide plate 7. When the slide chassis 3 moves, slide slots 11 and 12 formed in the slide chassis 3 are respectively guided by slide guide shafts 8 and 9 which are secured to the main chassis 1. This arrangement enables the slide chassis 3 to move in the directions of sliding as shown in FIG. 1. Shafts 10 and 20 and slots 13 and 23 are provided for restricting the position of the slide chassis 3 in the direction of its height when the chassis 3 moves, and are not directly used as guides for the movement of the chassis 3.

With the conventional apparatus arranged in the above-stated manner, when the slide chassis 3 slides in the direction of moving away from a rotary head drum 2, a load moment Ma comes to be imposed on the slide guide shaft 8 due to a lever 4 which is pivotally arranged on the slide chassis 3. Then, a driving force Fa for the slide chassis 3 brings forth a moment Mb centering on a connection point between the slide guide shaft 8 and the lever 4. At this instant, a force F which is as shown in FIG. 2 is applied to the slide guide shaft 9. In order to allow the slide chassis 3 to slide, a condition which is expressed as $Fb > \mu N$ is necessary. In the condition, "$\mu$" represents a coefficient of friction; $N = F\cos\Theta$; and $Fb = F\sin\Theta$. The limit value of the coefficient of friction $\mu$ is calculated as follows: since $Fb > \mu N$, there obtains a relation $\mu F\cos\Theta < F\sin\Theta$ therefore, $\mu < \tan\Theta$. The limit value of the coefficient of friction $\mu$ is thus determined by an angle $\Theta$ which is defined by the force F and the slide slot 12.

In the conventional apparatus, as described above, the angle $\Theta$ defined by the force F and the slide slot 12 is small. Therefore, an operable coefficient of friction becomes small. Changes occurring through a long service period would cause the actual coefficient of friction to easily exceed an operable range of the coefficient of friction. As a result, the action to cause the slide chassis 3 to slide has often been performed faultily. The occurrence of the faulty sliding action newly brings forth an additional moment which centers on a connection point between the slide guide shaft 9 and the slide slot 12 in the direction of the moment Mb. The additional moment then causes a malfunction to further hinder the movement of the slide chassis 3.

SUMMARY OF THE INVENTION

It is an object of this invention to provide a magnetic recording or reproducing apparatus having a cassette loading mechanism wherein the sliding action which is described in the foregoing is improved in the durability thereof and is never faultily performed.

To attain this object, a recording or reproducing apparatus according to this invention is arranged as follows: after a cassette containing a tape-shaped recording medium (hereinafter referred to as the tape) is mounted on the apparatus, when the tape moves toward a rotary head drum according to an action of wrapping the tape around the rotary head drum, a force for moving a slide chassis is applied to the inside of a plane defined by four points of four slide guide shafts on the slide chassis. Further, the slide chassis is arranged to be guided at two points which are diagonally located among the four points.

The invented arrangement increases the angle formed between the force F and the slide slot and thus increases the limit value of the coefficient of friction $\mu$. Therefore, the embodiment never comes to malfunction due to changes caused by aging.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
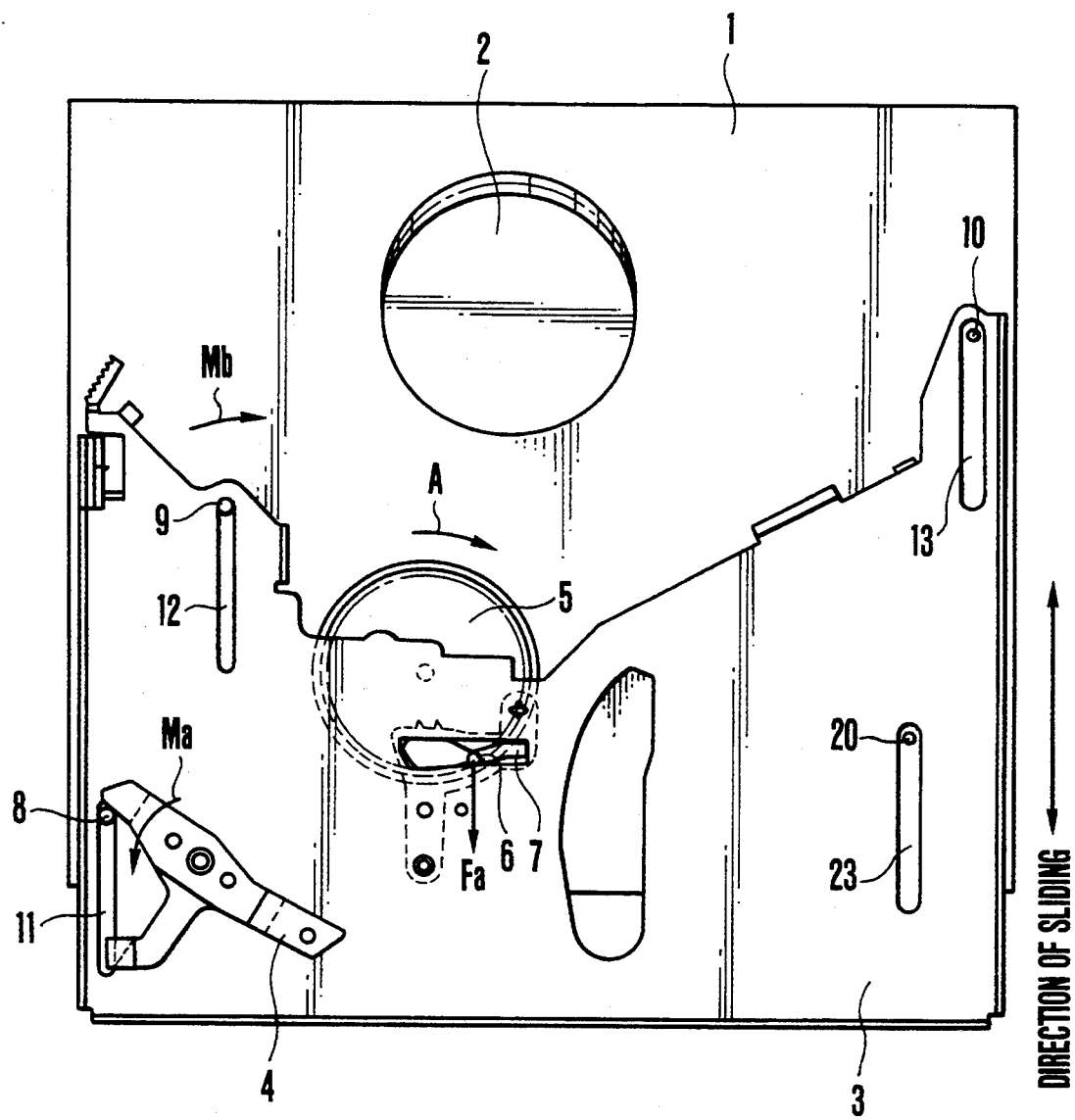
FIG. 1 is a plan view showing by way of example the conventional arrangement.
Figure 2:
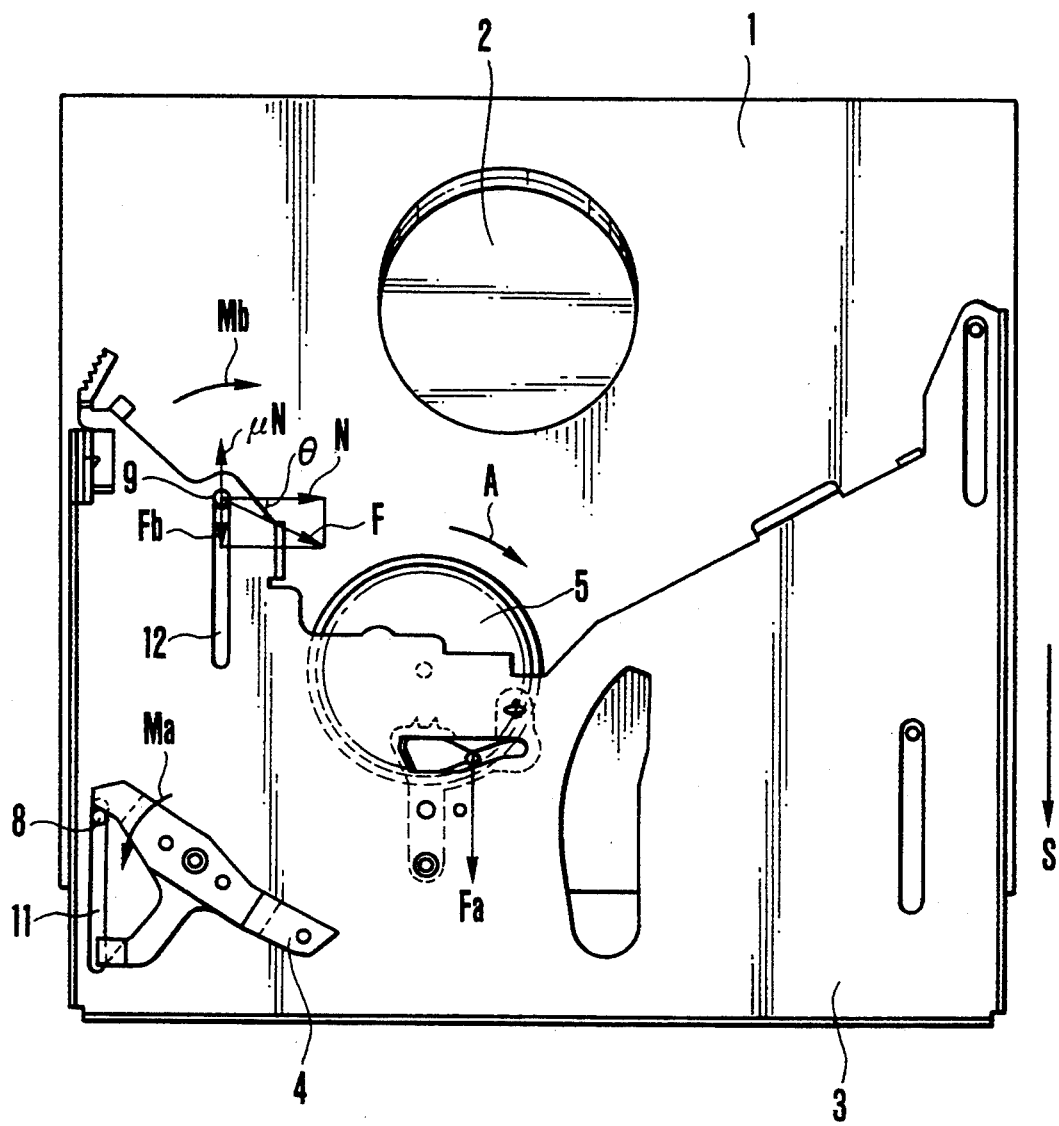
FIG. 2 shows the principle of the conventional arrangement.
Figure 3:
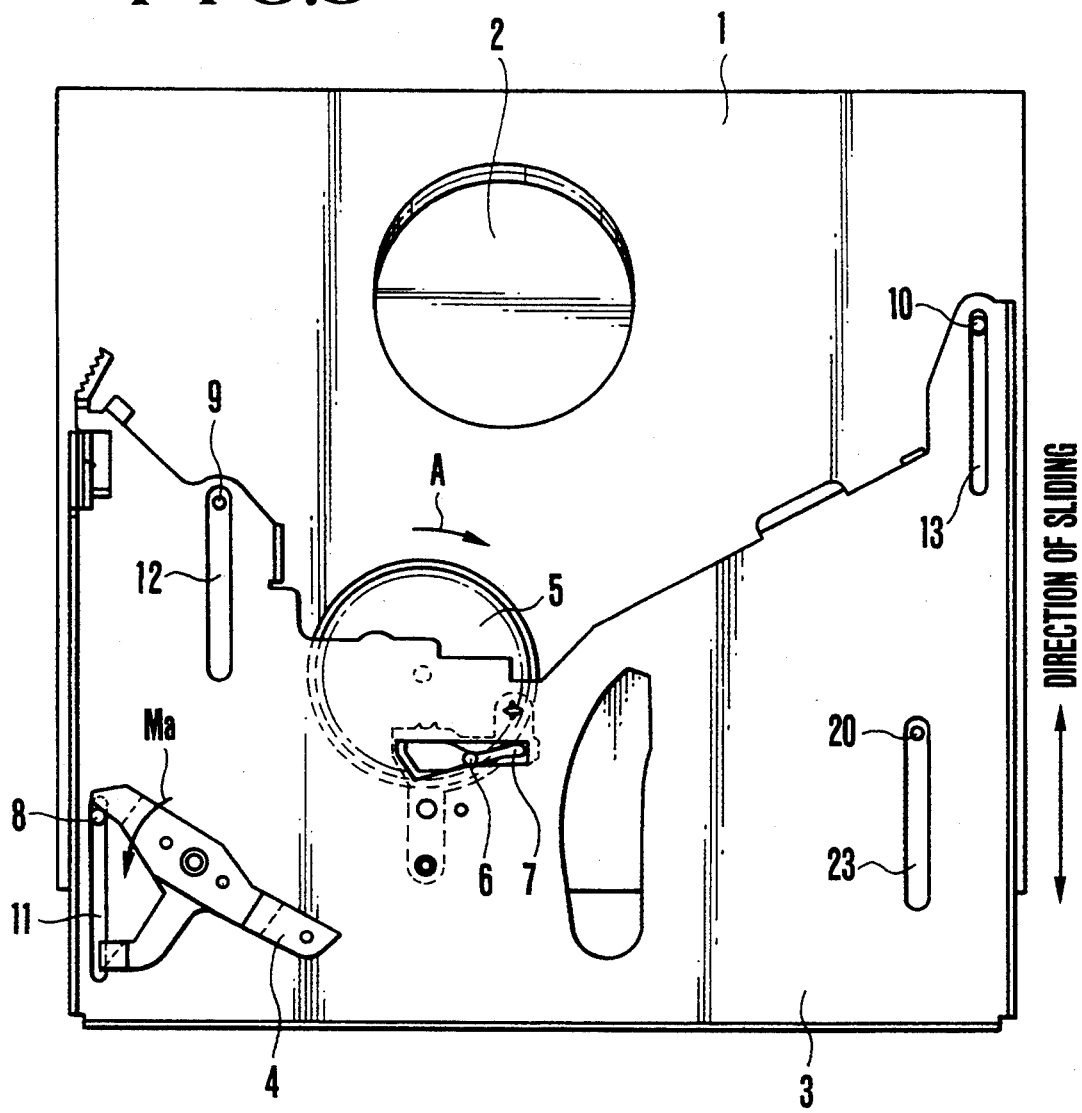
FIG. 3 is a plan view showing the arrangement of an embodiment of this invention.
Figure 4:
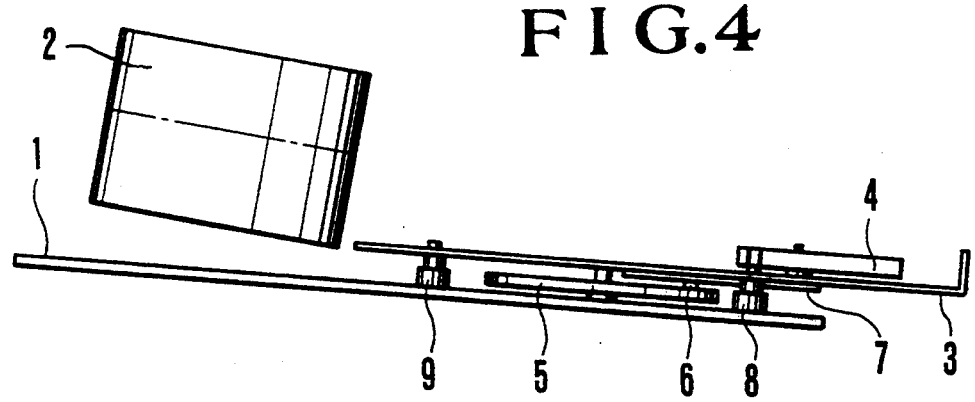
FIG. 4 is a side view of the arrangement of FIG. 1.

FIG. 3 shows in a plan view an embodiment of the invention. FIG. 4 is a side view of the embodiment shown in FIG. 3. Referring to FIGS. 3 and 4, a main chassis 1 has slide guide shafts 8, 9, 10 and 20 secured thereto. A reference numeral 2 denotes a rotary head drum. A slide chassis 3 is arranged to have a cassette and a reel driving system disposed thereon. A lever 4 is pivotally arranged on the slide chassis 3. A gear 5 is arranged to drive the slide chassis 3. A slide pin 6 is secured to the slide chassis driving gear 5 and is arranged to directly push the slide chassis 3. A slide plate 7 is arranged to be driven by the slide pin 6 and is secured to the slide chassis 3. The slide guide shafts 8, 9, 10 and 20 are secured to the main chassis 1. Slide slots 11, 12, 13 and 23 are provided in the slide chassis 3.

When a driving force of a loading motor which is not shown is exerted on the slide gear 5 in the direction of arrow A as shown in FIG. 3, the slide chassis 3 slides in the direction of moving away from the rotary head drum 2. The sliding movement of the slide chassis 3 is then guided by the slide guide shafts 8 and 10 and the slide slots 11 and 13 which are formed in the slide chassis 3.

Figure 5:
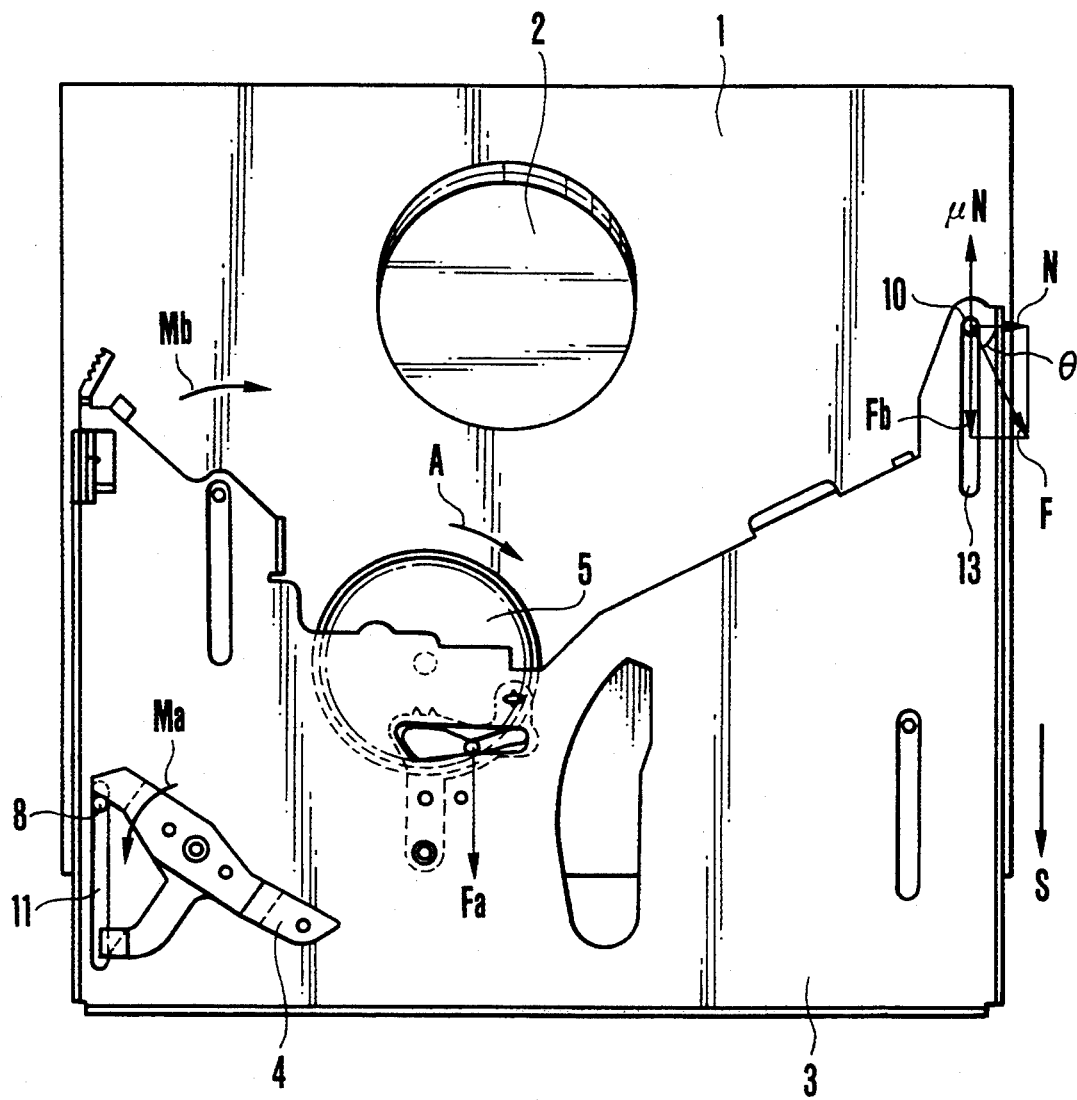
FIG. 5 shows the principle of this invention.

As shown in FIG. 5, the embodiment is arranged to increase the angle $\Theta$ formed by the force F and the slide slot 13 and the limit value of the coefficient of friction $\mu$ relative to the force Fb by arranging the slide chassis 3 to be guided jointly by the slide guide shafts 8 and 10 and the slide slots 11 and 13. In addition to that, the embodiment is arranged to bring forth a moment which centers on a connection point between the slide slot 13 and the slide guide shaft 10 and which is exerted in a direction opposite to the direction of the moment Mb when the coefficient of friction $\mu$ comes to exceed the limit value. This arrangement eliminates the possibility of any malfunction that results from aging or the like.

What is claimed is:

1. A recording or reproducing apparatus comprising:
   a) a first chassis to which a head is secured and defining an area distal from said head;
   b) a second chassis arranged to mount a recording medium thereon and arranged to be movable relative to said first chassis in given forward and reverse directions for disposing said recording medium in operative position relative to said head and in position withdrawn from said head;
   c) driving means positioned on said first chassis in said area thereof distal from said head for transmitting a driving force for moving said second chassis in said given directions;
   d) at least first and second guide means for guiding said second chassis, each said guide means including cooperative guide members defined respectively on said first and second chassis,
   at least one of the guide members defined on said first chassis being disposed in said area thereof distal from said head, said driving means being at a location intervening said guide members defined on said first chassis.

2. An apparatus according to claim 1, wherein each said first chassis guide member comprises an engaging shaft extending outwardly from said first chassis and wherein each said second chassis guide member comprises an engaging slot formed in said second chassis, each said engaging shaft being disposed in one of said slots.

3. An apparatus according to claim 2, wherein the number of said engaging shafts is four.

4. An apparatus according to claim 3, wherein said second chassis is generally rectangular and wherein said first and second guide means are located substantially on a diagonal of said second chassis.

5. An apparatus according to claim 1, wherein said head is a magnetic head.

6. An apparatus according to claim 5, wherein said magnetic head is disposed on a rotary drum.

7. An apparatus according to claim 6, wherein said second chassis is provided with a part for mounting a cassette in which a recording medium is stowed.

8. A slide chassis control mechanism comprising:
   a) a first chassis;
   b) a second chassis arranged to be movable relative to said first chassis;
   c) driving means positioned on said first chassis for transmitting a driving force for moving said second chassis;
   d) at least first and second guide means for guiding said second chassis, each said guide means including cooperative guide members defined respectively on said first and second chassis,
   said driving means being at a location intervening said first chassis guide members defined on said first chassis.

9. A mechanism according to claim 8, wherein each said first chassis guide member comprises an engaging shaft extending outwardly from said first chassis and wherein each said second chassis guide member comprises an engaging slot formed in said second chassis, each said engaging shaft being disposed in one of said slots.

10. An apparatus according to claim 9, wherein the number of said engaging shafts is four.

11. An apparatus according to claim 10, wherein said second chassis is generally rectangular and wherein said first and second guide means are located substantially on a diagonal of said second chassis.

* * * * *